May 22, 1951  B. C. FLEMING-WILLIAMS ET AL  2,553,907
APPARATUS FOR INDICATING THE POSITION OF BODIES
Filed Nov. 19, 1946
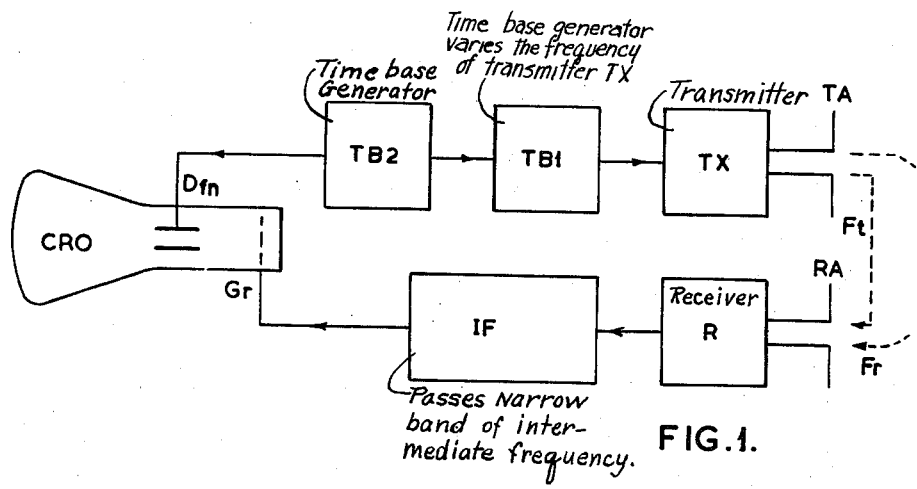
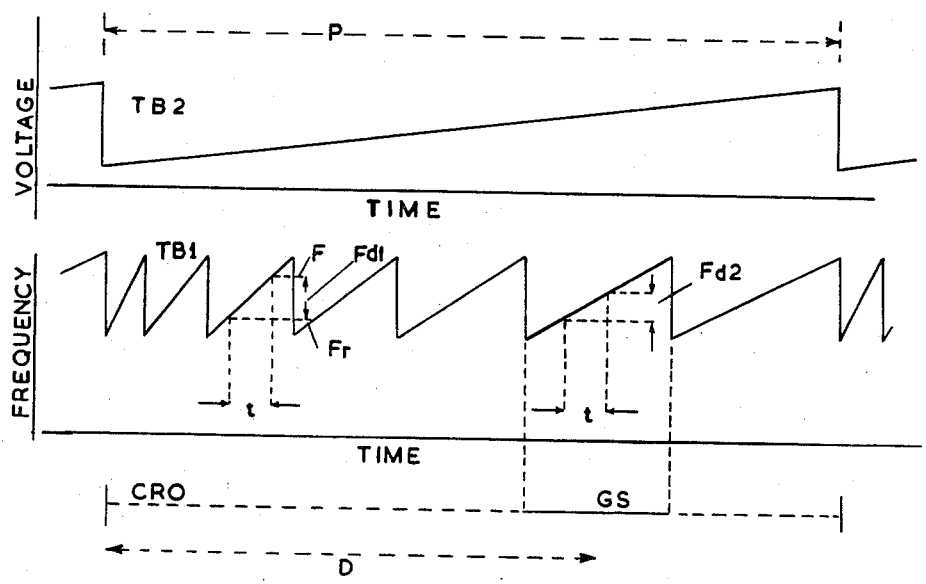
FIG. 2.
INVENTORS
Brian C. Fleming-Williams
Alaric Allen
By Ralph B. Stewart
Attorney Patented May 22, 1951

2,553,907

UNITED STATES PATENT OFFICE 2,553,907

APPARATUS FOR INDICATING THE POSITION OF BODIES

Brian Clifford Fleming-Williams and Alaric Allen, London, England, assignors to A. C. Cossor Limited, London, England, a British company Application November 19, 1946, Serial No. 710,756
In Great Britain November 20, 1945

6 Claims. (Cl. 343—14)

This invention relates to electrical equipment for determining the positions, or at least the distances, of remote bodies by means of radio echoes.

It is an object of the invention to provide such an apparatus in which the radio signals consist of a continuous wave which is frequency-modulated.

In an embodiment of the invention the transmitter frequency varies in saw-tooth fashion, that is to say, on a graph in which time is represented along the abscissa and frequency variation on either side of a mean frequency is represented on the ordinate, the graph will appear as an upwardly-sloping straight line or stroke between lower and upper limits, followed by an almost vertical drop or fly-back to the lower limit, whence the cycle is repeated. The slope of the rising line or stroke represents the rate at which the frequency is varying.

In the case of a transmitter and a receiver located together at an origin in space, the difference in frequency between the transmitted and received signals corresponds to the difference in time between transmission of a signal and reception of its echo, and this difference in time in turn corresponds to the distance away from that origin of the body which is giving rise to the echo. While that body remains at a constant distance, that time will remain constant; and hence the frequency-difference will remain constant. This latter, however, is true only for the times which lie wholly within the stroke of the frequency variation: for times which include the instant of fly-back, that is, which lie at the end of one sweep and the beginning of another, the difference in frequency is very irregular. However, the duration of this irregularity can be made quite short in comparison with the time during which the frequency difference is steady, so that being given a filter circuit which, like most tuned circuits, not only responds to that particular frequency but persists in resonance when that frequency is no longer applied to it, then the irregularity occurring as a result of fly-back can be eliminated, or at least, reduced sufficiently to give a substantially constant signal at the difference-frequency.

If then a resonant-filter-circuit is provided by which the resonant-frequency can be varied in a continuously progressive manner, the existence of any particular difference-frequency in the system can be determined and from it the distance from the origin of the respective body can be calculated.

A circuit in accordance with the above description would thus consist of a transmitter, a receiver so associated with the transmitter as to be able to pick up directly a small proportion of its transmission in addition to being able to pick up echoes, a filter circuit which will separate out the difference-frequency between the direct and echo signals, a resonant circuit continuously variable for a range of frequencies corresponding to the range of difference-frequencies that are to be looked for, and a means indicative of the instantaneous frequency at which the resonant circuit responds.

Such an equipment suffers from the disadvantage that a resonant filter circuit continuously variable in the manner indicated is not an easy device to construct or operate; consequently this invention provides an alternative equipment productive of the same results. The basis of this alternative is that the frequency-modulated transmission has the slope of the freqency-variation curve varied in a continuous manner, while, on the other hand, the filter circuit is of fixed frequency.

An embodiment of this form of the invention is shown in the accompanying drawing in which Figure 1 is a block diagram illustrating the transmitting and receiving arrangement, including the cathode-ray tube indicator, and Figure 2 includes two curves, one showing the sweep voltage wave for the cathode-ray tube and the other showing how the frequency of the transmitter varies with time.

Referring to Figure 1, the transmitter TX feeds into the transmitting aerial TA while the receiving aerial RA feeds into the receiver R, which includes in particular a rectifier giving rise in known manner to a plurality of frequencies, depending upon the frequencies received by the aerial RA. The association between the two aerials is such that there is a direct reception at the receiving aerial of the transmitted signal from aerial TA, this direct reception being represented by the arrow $Ft$, and an indirect reception by way of echo from the distant body being represented by the arrow $Fr$. Associated with the transmitter TX is the time-base circuit TB1, which causes a continuous wave sent out by the transmitter to be frequency-modulated in saw-tooth fashion. In consequence, at any given instant, receiving aerial RA is receiving the frequency $Ft$ which is at that same instant being transmitted by the aerial TA and also the frequency $Fr$, which differs from $Ft$ by an amount determined by the time taken for the radio signal to travel from TA to the reflecting body and back to RA. The receiver R feeds into an amplifier IF, which is fixedly tuned to pass a narrow band of frequencies corresponding to the difference between Ft and Fr when these have some certain value. A cathode ray tube CRO is arranged with a deflection system Dfn controlled by a time base TB2. The output from the fixed-frequency IF is applied to the grid of the cathode ray tube CRO so as to control the brightness of the spot on the screen. The time base TB2 controlling the deflection of the cathode ray tube also controls the time base TB1 so that throughout a deflection sweep in CRO the rate of frequency variation in TB1 is being progressively decreased. With this arrangement a reflecting body gives rise in the receiving aerial to oscillations which although fixed in respect of the time delay are varying in their frequency-difference. However, there is one point in such variation in frequency-difference at which the amplifier IF will be responsive to brighten the illumination on the screen of CRO. This point will occur at a time in the cycle of the deflection of sweep of TB2 corresponding to the distance of the reflected body, and thus an indication on the screen of the cathode ray tube will furnish the observer with an indication of such distance.

An understanding of this operation of the circuit will be aided by reference to Figure 2, consisting of a number of charts. The topmost chart, designated TB2, shows one complete cycle in the operation of the saw-tooth time base TB2. The frequency of TB2 is quite small, say 50 C. P. S., which would make the period P to be 1/50 second. The second chart, TB1, shows the operation of saw-tooth time base TB1 during the same period P, or in other words, the frequency-variation of transmitter TX during that period. The frequency of TB1 is very much greater than that of TB2, say of the order of 50 Kc. P. S., although the chart necessarily shows only a few cycles of TB1 in the period P of TB2. By reason of the control which time-base TB2 exercises over TB1, the rate of frequency-variation of TB1, i. e., the slope of the curve, is progressively decreased during the period P. (This need not mean that, as shown in the chart, the period of TB1 is progressively increased; the period may be kept constant and the total frequency-variation decreased.)

Now if the time elapsing between transmission of a signal and reception of its echo is $t$, then there will at any instant be a frequency difference Fd between the frequency Fr which is being received at that instant and the frequency Ft which is being transmitted at that instant. Assuming that the distant object remains stationary over the period P under consideration, then the time $t$ will remain constant also. This is not true however of the frequency-difference Fd, which will not remain constant, but will progressively decrease, an earlier cycle of TB1 giving a difference Fd1 and a later cycle giving a difference Fd2. Thus at some point in the cycle of TB2, the frequency-difference Fd will equal the frequency of the filter amplifier IF; as shown it is the frequency-difference Fd2 which is so equal. The third chart CRO represents the trace on the screen of the cathode ray tube, the point of origin being at the left-hand end. During the time that frequency Fd2 is being received the screen spot is brightened as indicated at GS. The distance D of the spot GS from the origin is a measure of the distance of the reflecting body in space from the aerial system.

We claim:

1. Apparatus for determining the distance of a body comprising a transmitter for transmitting a signal wave and including means for varying the frequency of said wave in a recurrent series of steps, the rate of change of frequency in successive steps in each of said series being progressively different from the rate of change in the first step of each series, a receiver for receiving a signal directly from said transmitter and an echo signal reflected from said body and including means for deriving from said received signals a beat wave of a frequency equal to the difference frequency between said received signals, whereby the echo signals from a reflecting object located at a given distance produces a beat wave of a distinctive frequency for each frequency varying step, a circuit energized by said difference frequency and being selectively responsive to a relatively narrow band of difference frequencies to receive the beat wave of only one of said steps, and indicator means responsive to the energization of said selective circuit to indicate the instant of occurrence of said one step.

2. Apparatus according to claim 1 wherein the rate of change of frequency in the successive steps in each series progressively decreases.

3. Apparatus according to claim 1 wherein the recurrent steps of frequency variation in each series have the same range of frequency variation, and the duration of the successive steps progressively vary correspondingly.

4. Apparatus for determining the distance of a body from an origin comprising a transmitter for transmitting a series of signal waves, each signal wave consisting of a wave train which increases in frequency throughout the period of the train, and the rate of change of frequency in the successive trains of each series decreasing uniformly throughout the series, a receiver for receiving a signal directly from said transmitter and a signal echo reflected from said body and including means for deriving from said received signals a beat wave of a frequency equal to the frequency difference between said received signals, whereby the echo signals from a reflecting object located at a given distance produces a beat wave of a distinctive frequency for each frequency varying step, and a fixed resonant circuit responding only to the beat wave generated during that wave train of the series that corresponds to the distance to be determined.

5. Apparatus for determining the distance of a body comprising a transmitter for transmitting a recurrent series of signal waves at predetermined recurrence frequency, the signal waves in each series comprising a succession of wave trains, each train being varied in frequency at a predetermined rate, and the rate for successive trains being progressively different, a receiver for receiving signals directly from said transmitter and echo signals reflected from said body and including means for deriving from said received signals a beat wave of a frequency equal to the difference frequency between said received signals, a cathode ray tube indicator having beam deflection means for deflecting the beam thereof along a predetermined axis, means controlled by said transmitter for energizing said deflecting means to periodically deflect said beam along said axis at said recurrence frequency, a circuit energized by said receiver and being selectively responsive to a relatively narrow band of difference frequencies to receive the beat wave produced by a given object during only one of said frequency varying steps, and means controlling said cathode ray tube by said circuit for producing an indication on said tube in response to energization of said circuit.

6. Apparatus according to claim 5 wherein said selective circuit controls the intensity of the electron beam of said cathode ray tube indicator.

BRIAN CLIFFORD FLEMING-WILLIAMS.
ALARIC ALLEN.

REFERENCES CITED

The following references are of record in the file of this patent:

UNITED STATES PATENTS

| Number | Name | Date |
|---|---|---|
| 2,268,587 | Guanella | Jan. 6, 1942 |
| 2,409,448 | Rost | Oct. 15, 1946 |
| 2,415,591 | Henroteau | Feb. 11, 1947 |
| 2,416,351 | Schelleng | Feb. 25, 1947 |
| 2,422,134 | Sanders | June 10, 1947 |
| 2,423,644 | Evans | July 8, 1947 |
| 2,436,627 | Blitz | Feb. 24, 1948 |